(12) United States Patent
Peleska et al.

(10) Patent No.: US 10,855,600 B2
(45) Date of Patent: Dec. 1, 2020

(54) SYSTEM, APPARATUS AND METHOD FOR TRAFFIC SHAPING OF DATA COMMUNICATION VIA AN INTERCONNECT

(71) Applicant: Intel Corporation, Santa Clara, CA (US)

(72) Inventors: Pavel Peleska, Graefelfing (DE); Reinhold Schneider, Veitsbronn (DE)

(73) Assignee: Intel Corporation, Santa Clara, CA (US)

(*) Notice: Subject to any disclaimer, the term of this patent is extended or adjusted under 35 U.S.C. 154(b) by 21 days.

(21) Appl. No.: 16/189,381

(22) Filed: Nov. 13, 2018

(65) Prior Publication Data
US 2019/0081900 A1 Mar. 14, 2019

(51) Int. Cl.
| | | |
|---|---|---|
| H04L 12/815 | (2013.01) | |
| H04L 1/00 | (2006.01) | |
| H04L 12/54 | (2013.01) | |
| H04W 28/22 | (2009.01) | |
| H04L 5/14 | (2006.01) | |
| H04L 12/70 | (2013.01) | |

(52) U.S. Cl.
CPC ............ *H04L 47/22* (2013.01); *H04L 1/0002* (2013.01); *H04L 1/0021* (2013.01); *H04L 5/1446* (2013.01); *H04L 12/5602* (2013.01); *H04W 28/22* (2013.01); *H04L 2012/568* (2013.01); *Y02D 70/1262* (2018.01)

(58) Field of Classification Search
CPC ... H04L 1/0002; H04L 1/0021; H04L 5/1446; H04L 12/5602; H04L 47/22
See application file for complete search history.

(56) References Cited

U.S. PATENT DOCUMENTS

| | | | | |
|---|---|---|---|---|
| 7,136,953 B1* | 11/2006 | Bisson | ............... | G06F 13/4018 710/307 |
| 7,426,597 B1* | 9/2008 | Tsu | ................ | G06F 13/4018 710/307 |
| 2006/0265612 A1* | 11/2006 | Tseng | ................ | G06F 13/385 713/300 |
| 2007/0232254 A1* | 10/2007 | Mackey | ............... | G06F 1/3203 455/343.1 |
| 2008/0285573 A1* | 11/2008 | Diab | .................. | H04L 12/2805 370/401 |

(Continued)

OTHER PUBLICATIONS

U.S. Appl. No. 15/967,225, filed Apr. 30, 2018, entitled "Data Rate-Adaptive Data Transfer Between Modems and Host Platforms," by Pavel Peleska, et al.

(Continued)

*Primary Examiner* — Gary Mui (74) *Attorney, Agent, or Firm* — Trop, Pruner & Hu, P.C.

(57) ABSTRACT

In one embodiment, an apparatus includes: a transmitter to send first data to a device coupled to the apparatus via a physical link; a receiver to receive second data from the device via the physical link; and a control circuit to control the transmitter to send the first data at a first effective rate during a link activation interval of a data transfer interval and to control the receiver to receive the second data at a second effective rate during the link activation interval, the second effective rate different than the first effective rate. Other embodiments are described and claimed.

18 Claims, 9 Drawing Sheets

(56) References Cited

U.S. PATENT DOCUMENTS

| | | | |
|---|---|---|---|
| 2009/0097392 A1* | 4/2009 | Diab | H04L 12/40136 370/201 |
| 2009/0097393 A1* | 4/2009 | Diab | H04B 3/32 370/201 |
| 2009/0097401 A1* | 4/2009 | Diab | H04L 12/40136 370/230 |
| 2009/0106636 A1* | 4/2009 | Jenkins | H04L 1/0041 714/804 |
| 2010/0316065 A1* | 12/2010 | Kapil | G06F 13/385 370/465 |
| 2010/0329108 A1* | 12/2010 | Diab | H04L 12/413 370/216 |
| 2012/0039174 A1* | 2/2012 | Robin | H04L 12/413 370/235.1 |
| 2013/0086400 A1* | 4/2013 | Teoh | G06F 1/3215 713/320 |
| 2014/0019654 A1* | 1/2014 | Trivedi | G06F 13/42 710/107 |
| 2019/0064909 A1* | 2/2019 | Bito | G06F 1/325 |
| 2019/0250930 A1* | 8/2019 | Erez | G06F 1/3296 |

OTHER PUBLICATIONS

PCI SIG, "PCI-SIG Engineering Change Notice—L1 PM Substates with CLKREQ, Revision 1.0a," May 31, 2013, 33 pages.

* cited by examiner

SYSTEM, APPARATUS AND METHOD FOR TRAFFIC SHAPING OF DATA COMMUNICATION VIA AN INTERCONNECT

TECHNICAL FIELD

Embodiments relate to data communication via an interconnect.

BACKGROUND

Many current Long Term Evolution (LTE) modems use a Peripheral Component Interconnect Express (PCIe) interconnect to connect and transfer data between a network, the modem, and a host platform. In these implementations, data is stored in modem off-chip memory as it arrives from an over-the-air (OTA) interface or from the host platform during an aggregation period. When the aggregation period expires, the PCIe link is activated and the data is delivered in the uplink and downlink directions. As data rates for fourth generation (4G) LTE generally do not exceed 5 Gigatransfers per second (GT/s), there are generally not throughput concerns as to communication of uplink and downlink data with the memory for such systems. However, for fifth generation 5G, higher data rates extending up to 16 GT/s are expected. In such systems, throughput peaks may exceed memory capabilities, such that designers are faced with a dilemma. That is, use a memory that supports a higher throughput is required, at the expense of cost and power. Or activate the PCIe link for longer durations, which also increases power consumption. Such scenarios are incompatible with handheld platforms that seek to use battery-provided energy as efficiently as possible to maximize battery life.

DETAILED DESCRIPTION

In various embodiments, a device such as a modem that communicates in multiple directions, namely uplink and downlink directions, may be configured to perform traffic shaping to balance communication of typically asymmetric amounts of data in the different directions. More particularly as described herein in typical use cases in a mobile device, much greater amounts of data are received from a network in the downlink direction than are communicated to the network in the uplink direction. Using embodiments herein to perform such traffic shaping may avoid or at least reduce throughput peak pressure on one or more memory devices. In this way, greater system efficiency can be realized, e.g., by using memory devices that support lower throughput. Furthermore, embodiments may realize power conservation by communicating data in shorter durations of time, allowing a link to more efficiently communicate data and then enter into a low power state. Stated another way, traffic shaping via communication of data at asymmetric data rates in uplink and downlink directions can lead to reduced system contention and shorter link occupancy durations, reducing power consumption.

Although embodiments are applicable to many different types of systems and components, for purposes of discussion herein example embodiments are with regard to modem circuits. And more particularly the examples herein are in the context of a modem that couples to one or more memory devices via a Peripheral Component Interconnect Express (PCIe) link. In such a modem, traffic shaping is used to balance the typically asymmetric payloads to be transported in uplink and downlink directions, such that memory throughput peaks are avoided, which otherwise might require using a memory supporting higher throughput at the expense of power and cost, or leading to contention that might lead to longer PCIe link occupancy, that also might also lead to higher power consumption in typical traffic scenarios.

Embodiments may control the PCIe link in a race-to-off fashion in which data to be transported over the PCIe link accumulated over an aggregation period, and the link is activated to simultaneously transfer uplink and downlink data at a most efficient data rate. Thereafter the link enters into an idle state (e.g., PCIe L12 substate typically) until the next periodic activation. At medium to high average transmission data rates, the most efficient PCIe link rate in terms of power consumption (e.g., expressed in Joules per bit (J/bit)) is typically the fastest rate that the physical layer supports. In the 5G modem case, this fastest rate is e.g., at the PCIe Gen4 operation level (16 GT/s). Typically, the amount of data to be transported in uplink direction (PCIe downstream) is a fraction of the data to be transported in downlink (PCIe upstream) direction, since during, e.g., a web browsing session, bulk payload packet data is retrieved from a network (downlink), and in the opposite direction (uplink) short acknowledge packets may dominate.

A PCIe link is a dual-simplex interface that provides symmetrical transport capabilities in both directions. Thus, if data communication for uplink and downlink is started simultaneously or with a small delay, transport hardware without an embodiment will use the available link transport bandwidth simultaneously, creating a throughput peak at the memory interface of up to twice the unidirectional link transport capability. Embodiments that incorporate traffic shaping techniques as described herein ensure that the data transfer direction with the larger amount of data per transfer determines the duration of the link activation. And in turn the data travelling in the opposite direction is distributed evenly over this link activation duration, such that this data does not double the throughput requirement on the memory, but only contributes proportionally by a relative amount per transfer interval. In an embodiment, traffic shaping may be configured prior to starting each transfer interval.

Thus using embodiments, memory capacity may be optimized, such that a given system can be configured with a memory that need not support an aggregate throughput of a given link in both directions. And furthermore, minimal memory contention may occur using such a lesser configured memory device, realizing reduced link activation duration. As such, embodiments realize efficiencies in power consumption by way of reduced activation duration for a link and reduced contention.

Figure 1:
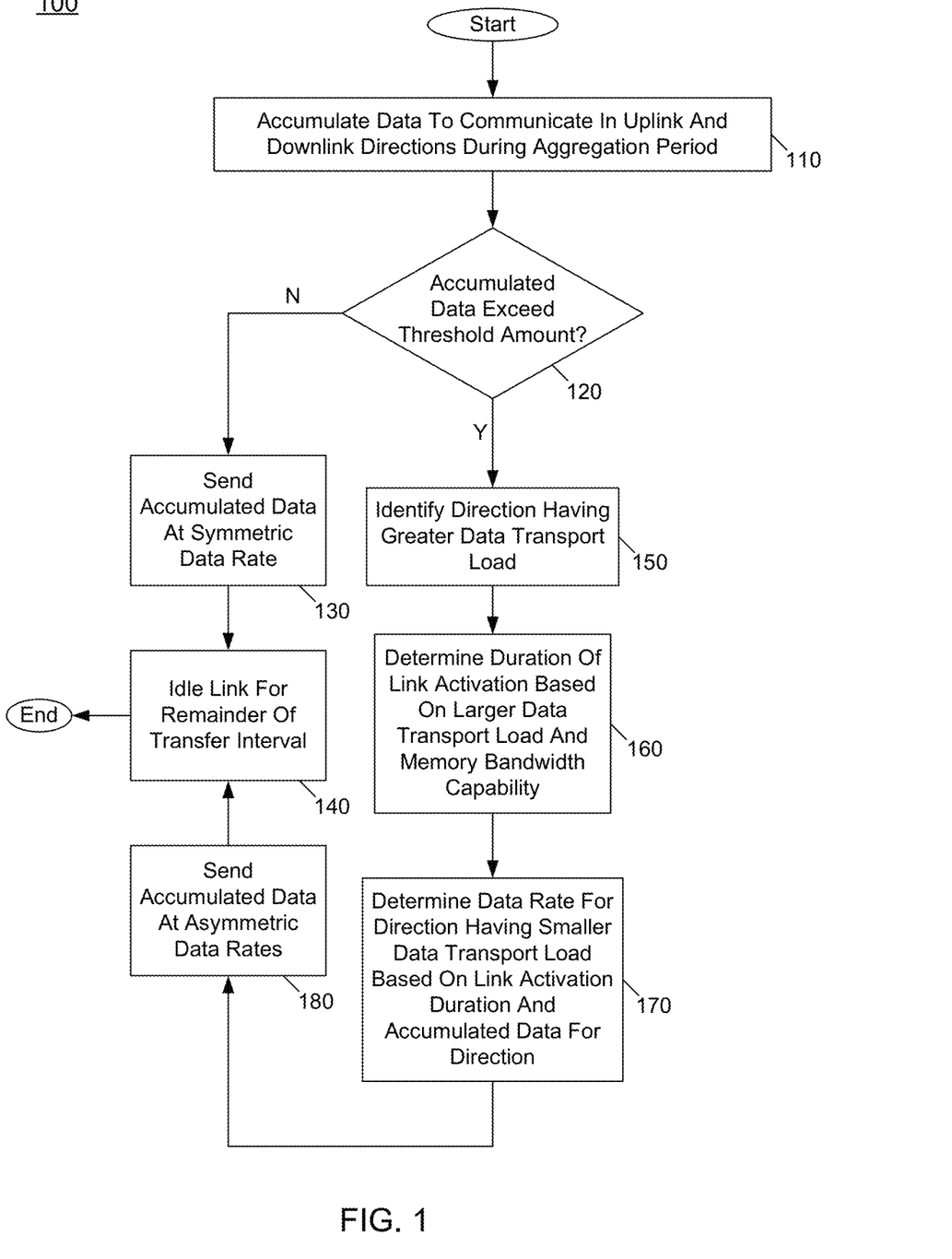
FIG. 1 is a flow diagram of a method in accordance with an embodiment of the present invention.

Referring now to FIG. 1, shown is a flow diagram of a method in accordance with an embodiment of the present invention. As shown in FIG. 1, method 100 is a method for controlling data communications along a link in accordance with an embodiment. More specifically, method 100 of FIG. 1 may be performed by a control circuit that may be implemented as part of an interface circuit. As such, method 100 may be performed by hardware circuitry, firmware, software and/or combinations thereof. This interface circuit in turn may interface a given device such as a modem with a physical link such as a PCIe link that couples the modem with another component, such as a memory device, e.g., a dynamic random access memory (DRAM). Although embodiments are not limited in this regard, in the example discussed in FIG. 1, assume that the control circuit and the interface circuit (both of which may be included in a modem) are included in or coupled to an application processor, system on chip (SoC) or other processing device, such as may be incorporated into a mobile device, e.g., a smartphone or so forth.

As illustrated, method 100 begins by accumulating data to communicate in uplink and downlink directions during an aggregation period (block 110). Although the scope of the present invention is not limited in this regard, as one example this aggregation period in which data to be communicated in both of uplink and downlink directions is buffered may be on the order of, e.g., approximately 1 millisecond (ms). Note that this accumulated data may be buffered in the memory device itself. To this end, downlink data received in the mobile device from a network is buffered in the DRAM prior to being sent for processing within the application processor. In turn, uplink data to be sent from the application processor to the network also is buffered in the respective DRAM of the application processor.

When this aggregation period is completed, it is determined at diamond 120 whether the accumulated data exceeds a threshold amount. Note that in some embodiments, this determination may be an optional operation. However for purposes of discussion, assume that this determination is made by comparison of the amount of accumulated data to the threshold amount which, in an embodiment, may correspond to a specified maximum bandwidth capability of the memory device. For example, a given mobile device may include a DRAM or other memory device that has a maximum bandwidth of 24 Gbps equivalent, allocated for use by the PCIe interface. Note of course that this threshold amount can vary and may in some cases be selected to be slightly lower than the specified maximum bandwidth capability to ensure efficient operation.

If it is determined that the accumulated data does not exceed the threshold amount, the accumulated data can be sent at a symmetric rate in both the uplink and downlink directions (block 130). Note that such data communication can be scheduled for a limited portion of a transfer interval, so that after completion of this data communication, the link may be placed into an appropriate low power state for a remainder of the transfer interval. In one embodiment, the symmetric data rate may be set at a maximum transfer rate for the data link and in a particular PCIe link embodiment, this maximum data rate may be set at 16 GT/s. Control next passes to block 140 where, after all of the accumulated data for the aggregation period has been sent, the link may be placed into an idle state for the remainder of the transfer interval. As one example the transfer interval may also be set at one millisecond, namely the same duration as the aggregation period. However understand that the aggregation period and the transfer interval may be set at different values in other embodiments. In addition to idling the link itself, it is possible that certain interface circuitry, including a physical layer and upper layers of a communication protocol stack, also may be placed into an idle or other low power mode for the remainder of the transfer interval.

Note that data transfer at symmetric data rates may not be suitable in all circumstances. For example, when significantly different quantities of data are to be sent in the different directions, such symmetric data rates may not be appropriate. This is so, as symmetric transfer at a high rate may cause bandwidth issues in the memory device. Such bandwidth issues can actually cause the data transfer to take a longer duration to complete, thereby increasing power consumption.

As such, in embodiments it is possible instead to implement asymmetric data rates in the uplink and downlink directions. More specifically, embodiments may enable traffic shaping to regulate the communication of data in a given direction to reduce bandwidth consumption with respect to the memory device. Thus as further illustrated in FIG. 1, if it is determined that the accumulated data exceeds the threshold amount, control instead passes to block 150, where the control circuit can identify the direction of data transfer that has a greater transport load. Most typically, there will be greater amounts of data for downlink transfer than for uplink transfer. This is so, as for a mobile device most data traffic is for downloading information from a network. For purposes of discussion in FIG. 1, assume that the identification of the direction having the greater data transport load is in the downlink direction.

Next at block 160 a duration of link activation can be determined. More specifically, this link activation duration may be determined based on the larger data transport load and the memory bandwidth capability. Assume for example an implementation in which there is an equivalent of 8 Gbps data to be transferred in this direction with a greater load and the memory device has a bandwidth of an equivalent of 24 Gbps. In this instance, the link activation duration may be set at approximately 50% assuming a unidirectional link transport capability of 16 Gbps.

Control next passes to block 170 where the data rate for the direction having the smaller data transport load may be determined. In this example, this direction is the uplink direction. And as shown at block 170, this data rate determination may be based on the link activation duration and the accumulated data for this direction. Assume that there are an equivalent of 4 Gbps of data to be transmitted in the uplink direction and the link is to be active for 0.5 ms. In this case, the data rate for the uplink direction can be set to approximately an equivalent of 4 Gbps. Note that although not shown in FIG. 1, for the downlink direction the data transfer rate may by default be set to the maximum link speed of 16 GT/s. In other cases, this data rate also may be determined based on the link activation duration and the accumulated data for the downlink direction.

Still with reference to FIG. 1, control next passes to block 180 where the accumulated data may be sent in the different directions at asymmetric data rates. To effect the data transfer, the control circuit may configure transmit and receive circuitry of interface circuitry for these data rates. In an embodiment, the appropriate setting may be done with a single posted or non-posted configuration write. As such, the data transfers in different directions may occur for substantially the same amount of time, namely for the full link activation duration. During this time, the full amount of downlink data may be transferred (e.g., equivalent of 8 Gbps in this example) while during the same link activation duration, the full amount of uplink data (e.g., equivalent of 4 Gbps in this example) also is transferred. Control next passes to block 140 discussed above. As a result of the traffic shaping, the peak throughput at the memory may be limited, reducing pressure on the memory. Note that with an example embodiment, a physical link data rate may still be at a given rate, e.g., 16 GT/s, but an effective data rate is the data rate at which the link transports useful information that is subject to traffic shaping. Understand while shown at this high level in the embodiment of FIG. 1, many variations and alternatives are possible. Note that in an embodiment, the traffic shaping parameters may be reconfigured prior to every link activation, or upon a significant traffic scenario change only.

Figure 2:
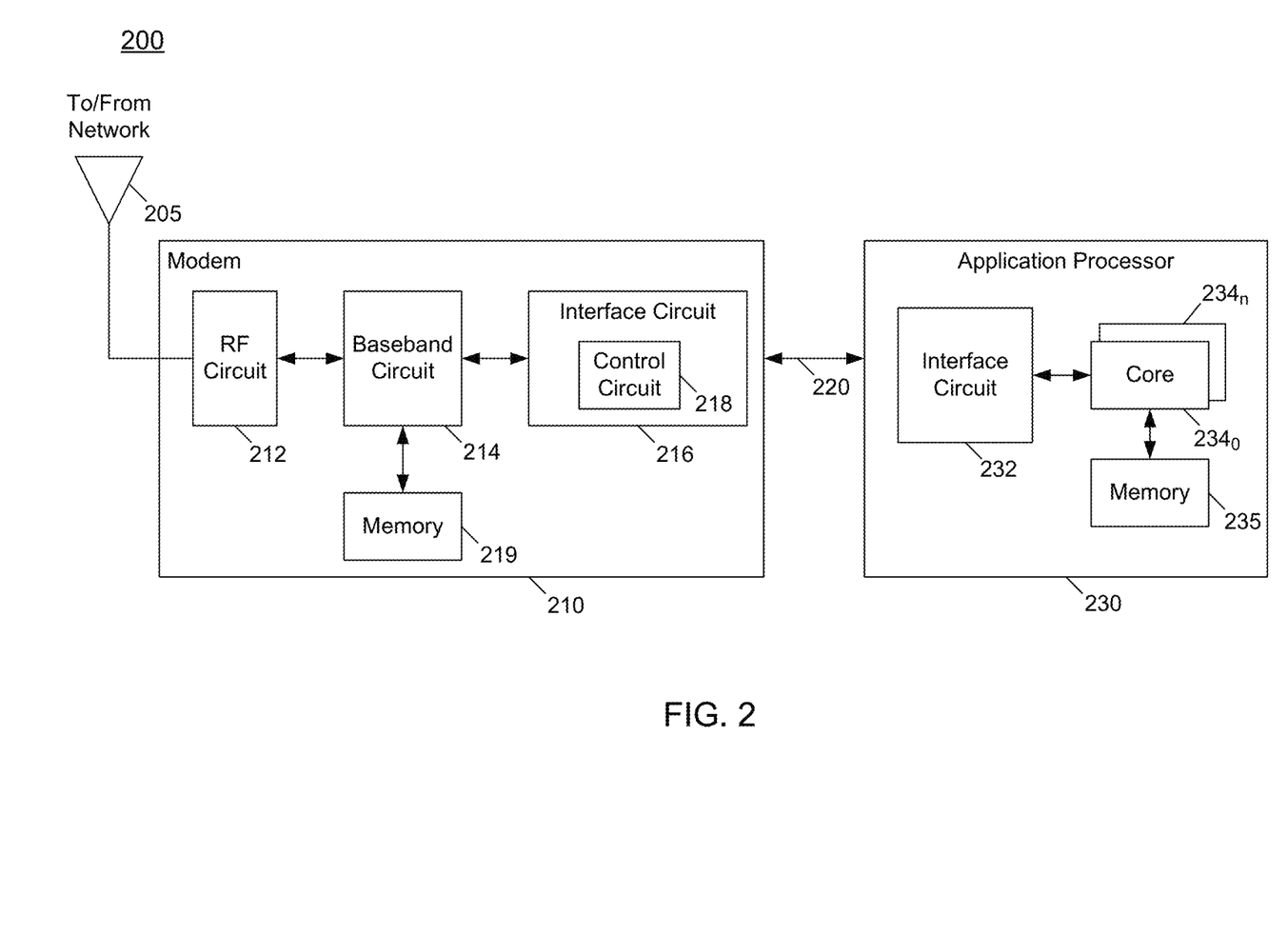
FIG. 2 is a block diagram of a portion of a system in accordance with an embodiment of the present invention.

Referring now to FIG. 2, shown is a block diagram of a portion of a system in accordance with an embodiment of the present invention. More specifically as shown in FIG. 2, system 200 may be any type of connected computing device. For example, system 200 may be a mobile device such as a smartphone or tablet computer, a laptop or desktop computer, a server computer or so forth. In still further embodiments, system 200 may be another type of connected device such as an Internet of Things (IoT) device. In any event, in the high level shown in FIG. 2, system 200 includes an antenna 205 to transmit and receive information by way of radio signals. In turn, antenna 205 couples to a modem 210 that processes information in both directions, namely processing uplink data into radio signals for communication via antenna 205 and similarly, processing incoming radio signals into downlink data for communication in the downlink direction for further handling by system 200.

In the implementation shown in FIG. 2, modem 210 includes a radio frequency (RF) circuit 220 to interface with antenna 205. In turn, RF circuit 212 couples with a baseband circuit 214 that in turn couples to a memory 219 which may be an on-chip or off-chip memory. As will be described further below, memory 219 acts as a buffer for buffering information in both the uplink and downlink directions. Memory 219 may be circuitry configured to store data, program code, or logic for operating modem 210. Memory 219 may be a double data rate (DDR) DRAM circuit. Although DDR is used as an example for memory 219, the scope of the present invention is not limited to such technologies and any type or combination of memory technologies can be used. Additionally, as used herein the term "off-chip memory" may refer to a memory device or circuitry that is integrated in a different IC or SoC than baseband circuit 214, and the term "off-board memory" may refer to a memory device or circuitry that is mounted on a separate board than the baseband circuitry 214. Baseband circuit 214 includes interface circuitry including transmit and receive circuitry to communicate with memory 219, and control circuitry to configure the traffic shaping described herein.

As further illustrated, baseband circuit 214 also couples with an interface circuit 216 that includes a control circuit 218. In embodiments herein, interface circuit 216 and its constituent control circuit 218 may be configured to dynamically control data rates asymmetrically in uplink and downlink directions with respect to communications on a physical link 220, which in an embodiment may be a PCIe link.

In an embodiment, PCIe link 220 may be a dual unidirectional differential link implemented as a transmit pair for transmitting signals and a receive pair for receiving signals. A data clock may be embedded using an encoding scheme to achieve very high data rates. Each link may support at least one lane, where each lane represents a set of differential signal pairs (e.g., one pair for transmission and one pair for reception), and each link can support a number of lanes in each direction (e.g., an ×16 link indicates there are 16 differential signal pairs in each direction). To scale bandwidth, a link may aggregate multiple lanes denoted by ×N where N may be any of the supported link widths. An ×8 link operating at the 2.5 GT/s data rate represents an aggregate bandwidth of 20 Gbps of raw bandwidth in each direction. Lane widths may include sizes of ×1, ×2, ×4, ×8, ×12, ×16, and ×32, for example. During hardware initialization, PCIe link 220 may be set up following a negotiation of lane widths and frequency of operation by two agents at each end of the link.

With aggregation period control described herein, data packets may be stored in memory 219 (or in particular buffers or registers of memory 219) as baseband circuit 214 demodulates or otherwise converts signals received OTA. While the data packets are stored in memory 213, link 220 may be in an "off" state or low power mode. For example, where the link is a PCIe link this "idle" state may be the L1.1 or L1.2 state where no (little) power is present in a physical layer (PHY). Interface circuit 216 or baseband circuit 214 may implement a clock or timer to measure an aggregation period or aggregation interval, during which the data packets are to be stored in memory 219. When the aggregation period expires, interface circuit 212 or baseband circuit 214 may read the data packets from memory 219 to a buffer of on-chip memory circuitry, and may send the buffered data to an application processor 230 as a data transfer burst (e.g., 1 millisecond (ms) bursts).

As illustrated, PCIe link 220 couples modem 210 with application processor 230. Application processor 230 may be a main central processing unit (CPU) for system 200 and may include an interface circuit 232 such as an input/output circuit, peripheral controller hub or so forth to interface with modem 210 via link 220. Understand interface circuit 232 may further interface with other components of a system not shown for ease of illustration in FIG. 2. As further shown, application processor 230 also includes one or more cores 234$_0$-234$_n$ that may interface with a memory 235, which in an embodiment may be DRAM.

In the typical use case of embodiments herein, greater amounts of data are downloaded from a network to system 200 in the downlink direction than are uploaded in the uplink direction from system 200 to the network. As such, there may be memory contention issues when performing data transfers of this information with respect to one or more memories, including memory 219 and/or memory 235 (via link 220). As such, control circuit 218 may determine data rates for at least one of the uplink and downlink directions dynamically in a manner to shape traffic or otherwise regulate the data traffic in the direction associated with the lower data transport load to reduce loading on links and/or memory, as described herein. Understand while shown at this high level in the embodiment of FIG. 2, many variations and alternatives are possible.

Figure 3:
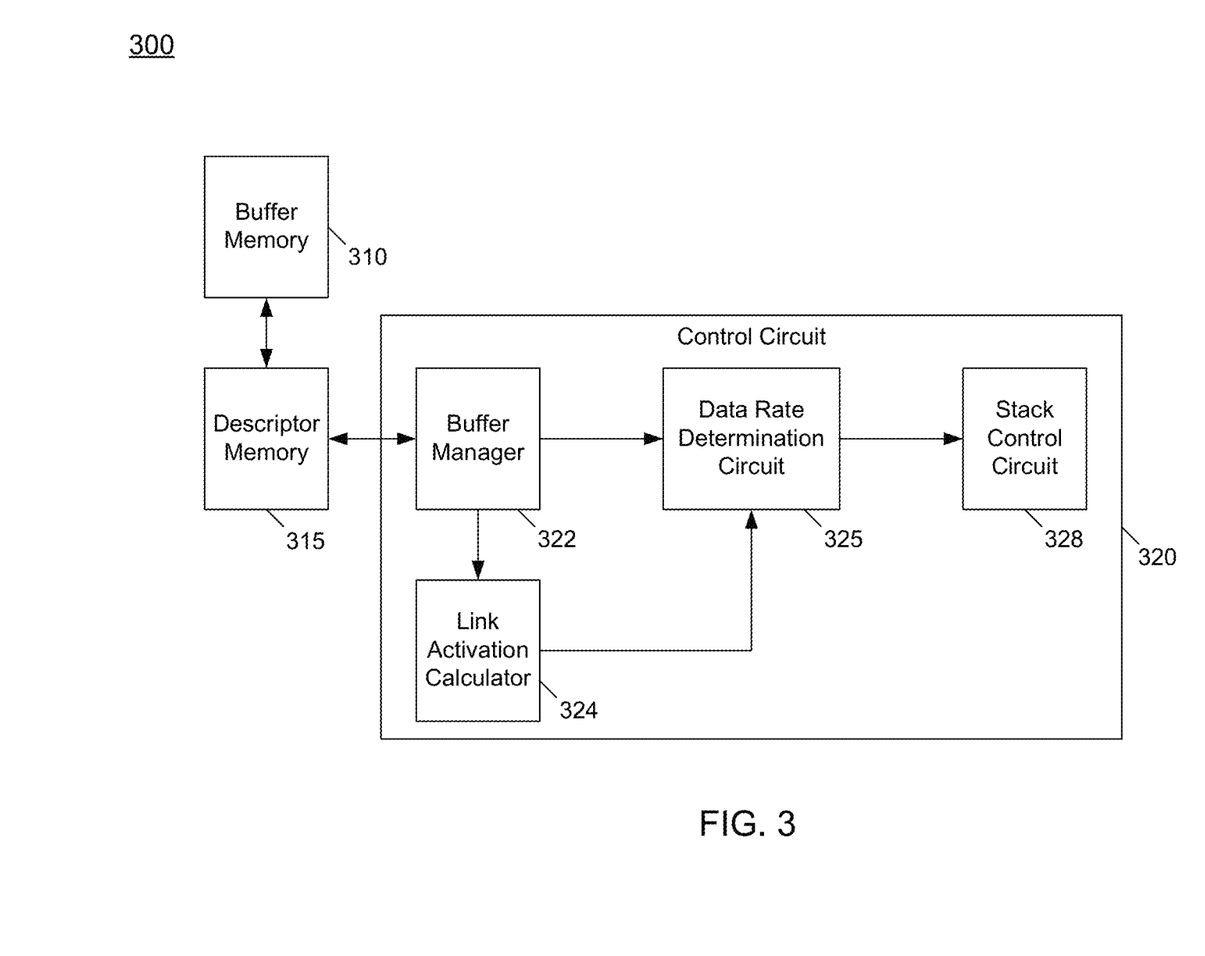
FIG. 3 is a block diagram of further details of a modem in accordance with an embodiment.

Referring now to FIG. 3, shown is a block diagram of further details of a modem in accordance with an embodiment. As shown in FIG. 3, modem 300 includes a buffer memory 310 and a descriptor memory 315. Although shown as separate devices, understand that in various implementations, memories 310 and 315 may be part of the same memory device, e.g., memory 219 of FIG. 2. In embodiments herein, buffer memory 310 may be configured with separate uplink and downlink data buffers to store data to be communicated in uplink and downlink directions. In turn, descriptor memory 315 may store descriptor information for the buffered data. Such descriptor information provides metadata regarding the buffered data including amount of data stored and other information.

Still with reference to FIG. 3, modem 300 also includes a control circuit 320 that is configured to control interface circuitry (itself not shown for ease of illustration in FIG. 3). As illustrated, control circuit 320 includes a buffer manager 322. Buffer manager 322 may be configured to determine, for a given transfer interval, an amount of data to be communicated in both uplink and downlink directions. To this end, buffer manager 322 may access descriptor memory 315 to determine the amount of data for communication in both the uplink and downlink directions. This information in turn is provided to a link activation calculator 324. In embodiments herein, link activation calculator 324 may calculate a link activation duration based at least in part on the amount of accumulated data and a bandwidth capability of a memory. To this end, link activation calculator 324 or other component within control circuit 320 may include a configuration register that stores the bandwidth capability for the target memory. In an embodiment, such configuration register may be written, e.g., by firmware such as basic input/output system (BIOS), based on capabilities of a particular memory device.

As further illustrated, control circuit 320 also includes a data rate determination circuit 325. In embodiments herein, data rate determination circuit 326 may determine a data rate for at least one of the uplink and downlink directions based on the amount of data to be communicated in the given direction and the link activation duration. More specifically as described herein, data rate determination circuit 325 may determine a data rate for the direction having the smaller data transport load, so that data traffic may be shaped or regulated to reduce pressure on the memory device. While it is possible for data rate determination circuit 325 to further dynamically calculate data rate for the direction having the greater transport load, in many embodiments instead this data rate may be set to a predetermined value, e.g., by BIOS or other firmware, to be at a maximum supported rate. As further illustrated, control circuit 320 also includes a stack control circuit 328 that is configured to control configuration parameters for a communication protocol stack, e.g., a PCIe stack, to thus operate at the determined asymmetric data rates. Understand while shown at this high level in the embodiment of FIG. 3, many variations and alternatives are possible.

Using embodiments with traffic shaping, reduced concurrent load to a memory can be realized. To illustrate the possibility of memory contention or other issues in the absence of traffic shaping as described herein, reference may be made to the timing diagram of FIG. 4, which illustrates concurrent data transfers in uplink and downlink directions at a maximum data rate of a link (e.g., 16 GT/s). Assume for purposes of FIG. 4, a modem for 5G operation that supports 6 Gbps in the downlink direction and, e.g., 3 Gbps in the uplink direction. When the modem communicates via a PCIe link, data transfer begins simultaneously in both directions. When communication in both directions is performed at a maximum supported rate, which for PCIe Gen4 is at 16 GT/s as illustrated in FIG. 4, the uplink and downlink directions may generate a total of twice this amount of data, namely 32 Gbps.

Figure 4:
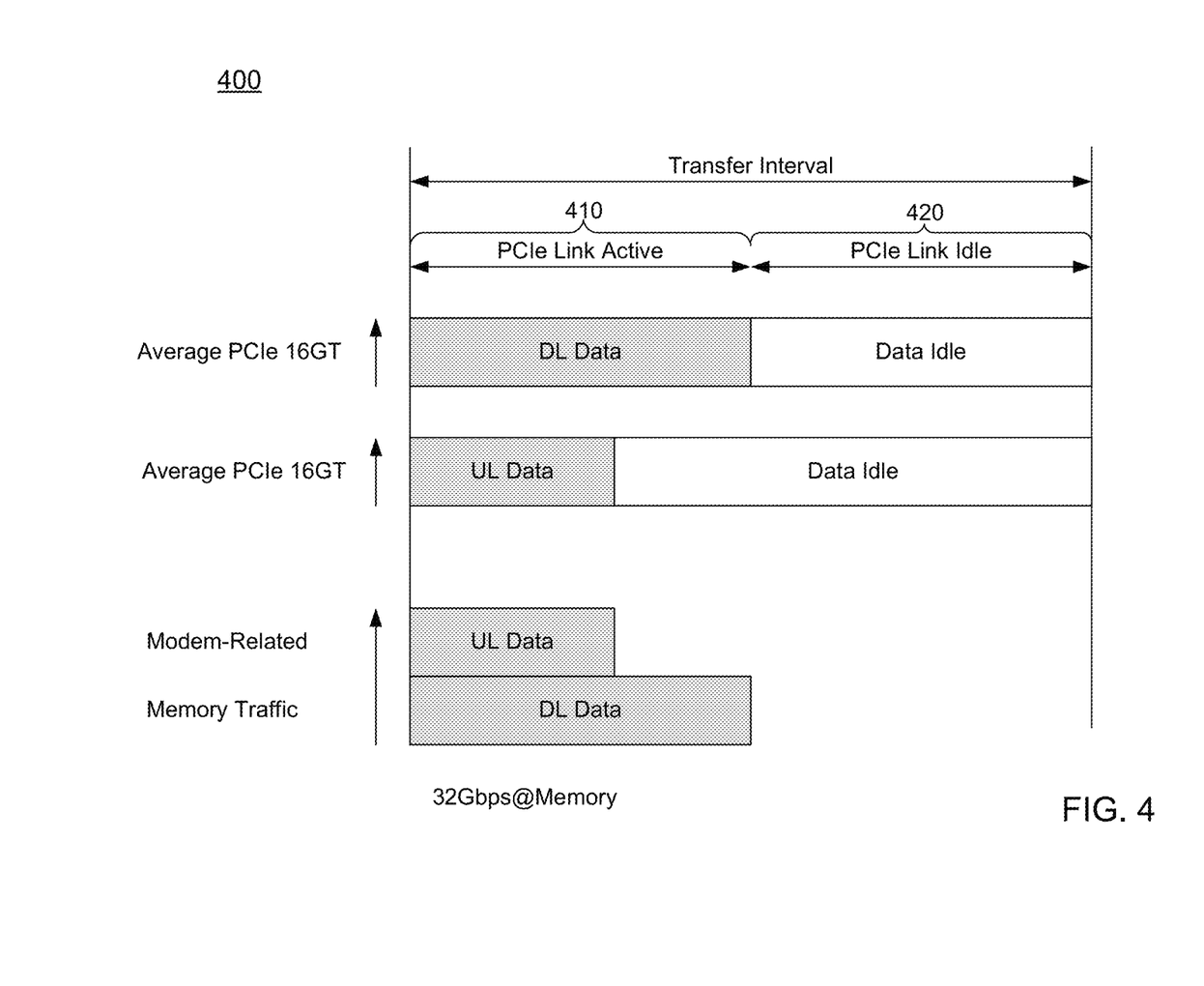
FIG. 4 is a timing diagram for communication during a transfer interval.

With this example for communication of 6 Gbps in the downlink direction and 3 Gbps in the uplink direction without an embodiment implementing traffic shaping as described herein, during a single transfer interval there is an established link active duration 410 as shown in FIG. 4. At the beginning of link activation duration 410, communication occurs at the maximum data rate of 16 GT/s in both directions. After data is communicated, a link idle duration 420 occurs. As illustrated, the data communication in the uplink direction finishes much earlier than for the downlink direction (in this case in approximately half the amount of time). With both directions communicating at the maximum supported data rates at the beginning of link activation duration 410, an initial bandwidth requirement of 32 Gbps thus exists, in addition to any bandwidth requirements of other users of a memory device. If the memory device cannot support this high bandwidth requirement (in addition to other subscribers), reading of the downlink data from the memory device may be slower than illustrated in FIG. 4, leading to a longer link activation duration and higher power consumption costs.

Figure 5:
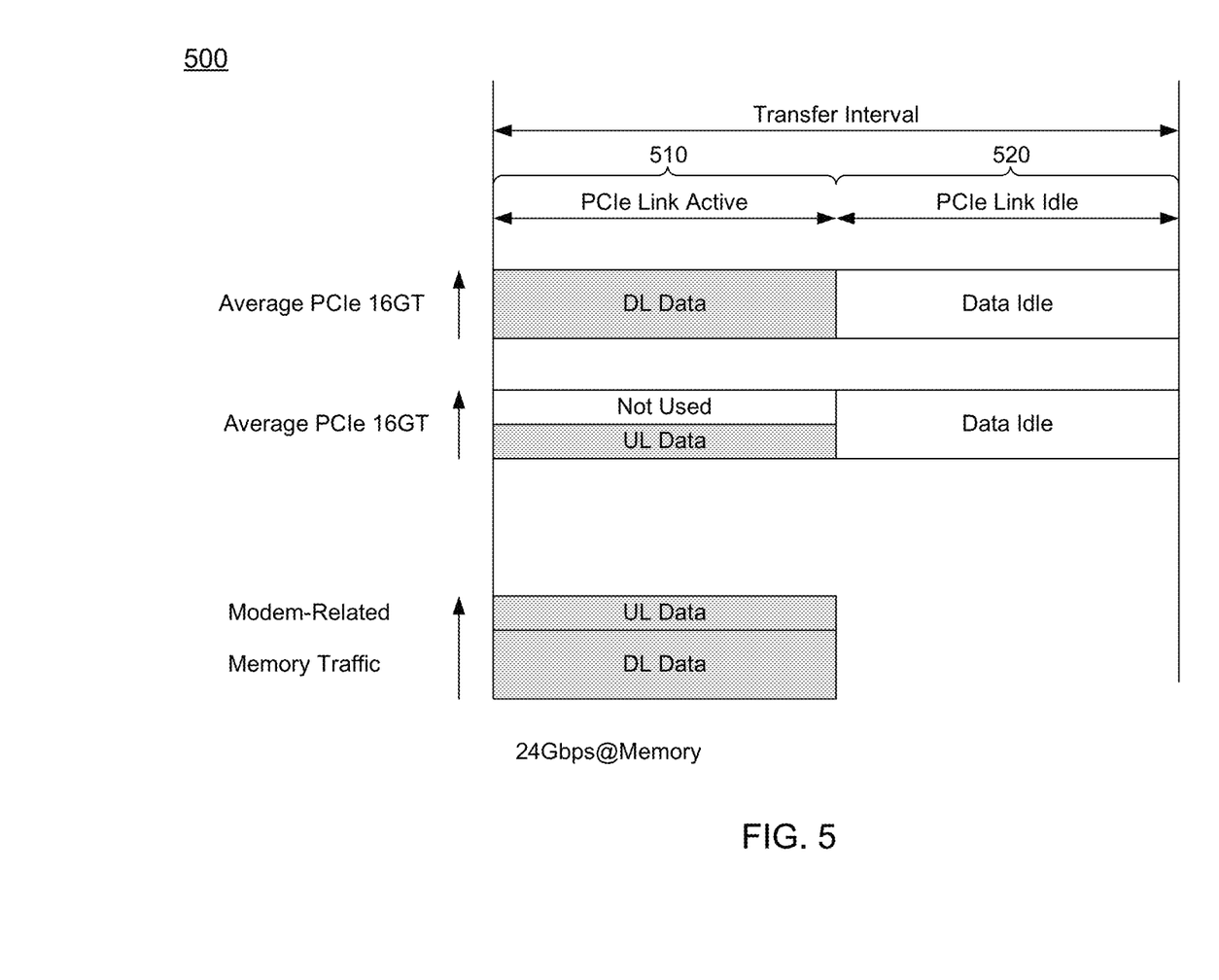
FIG. 5 is a timing diagram for communication during a link transfer interval using traffic shaping in accordance with an embodiment.

Instead with an embodiment using traffic shaping as described herein, data communication for the direction having the lower data transport load can be at a lower data rate to make a duration of this data communication at least substantially co-terminously to the expected data communication duration for the direction (e.g., downlink) having the greater data transport load. Referring now to FIG. 5, shown is a timing diagram for communication during a link transfer interval using traffic shaping in accordance with an embodiment. As shown in FIG. 5, during transfer interval 500, during a link activation duration 510, communication occurs in the uplink and downlink directions concurrently for at least substantially all of link activation duration 510. As such, as illustrated in the timing diagram of FIG. 5, the data rate for this lower data transport load direction is set at a lower rate, e.g., at half the rate, using the same example of 6 Gbps for the uplink direction and 3 Gbps for the downlink direction. After data is communicated, a link idle duration 520 occurs.

Thus in this case, when, e.g., only half of the data amount is to be transported in the uplink direction as compared to the downlink direction, the uplink data traffic is stretched via traffic shaping such that it finishes in substantially the same amount of time as the transport data in the downlink direction, e.g., the data at maximum data rate. In the use case of a PCIe Gen4 (×1@16 GT/s) link, the uplink data can be stretched such that it will only contribute 8 GT/s to memory traffic over the link activation time. Thus a memory that may only deliver, e.g., 24 Gb/s of bandwidth will not lead to an extended link activation time, i.e., wasting power, nor is a more performant memory required. It is often the case in actual use that the amount of data to be transported in uplink direction is less than half of the downlink data (e.g., as low as 1/10 or less). As such, embodiments may substantially reduce throughput requirements, and avoid costly components or waste of power.

Figure 6:
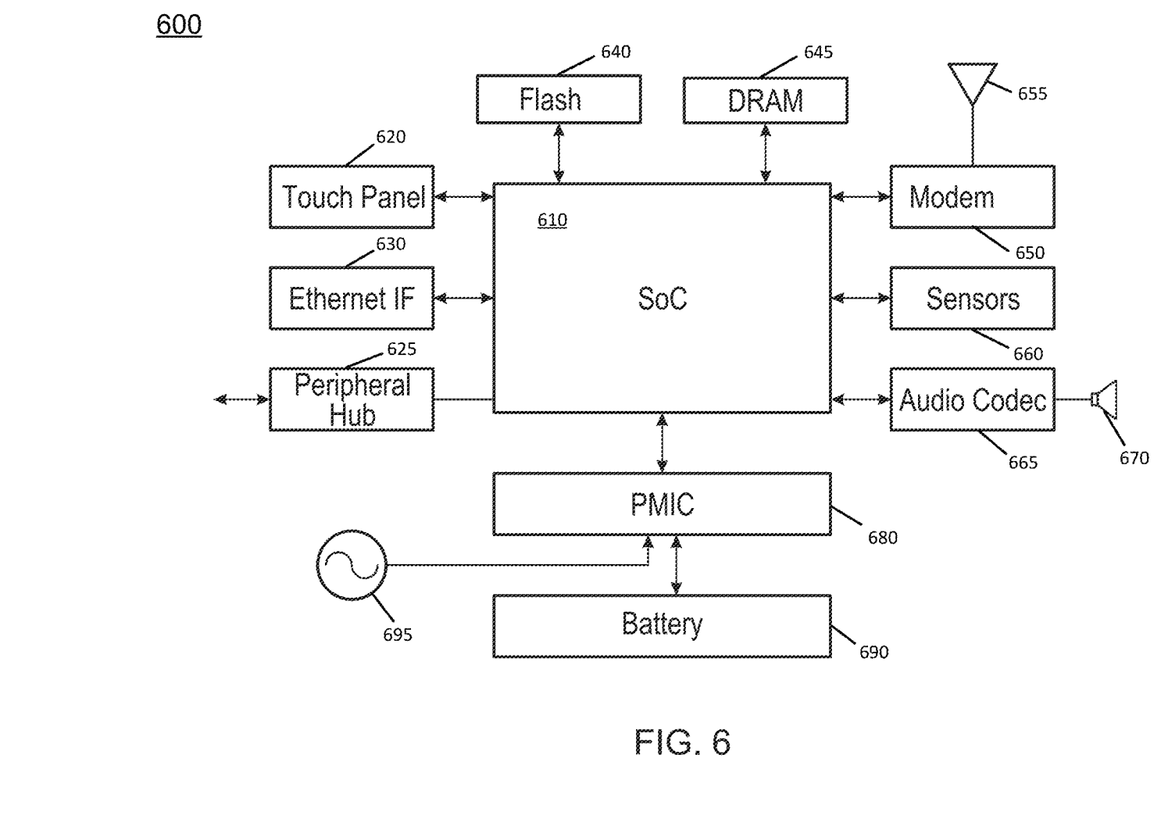
FIG. 6 is a block diagram of an example system with which embodiments may be used.

Embodiments as described herein may be implemented in a wide variety of system types, ranging from small portable devices to larger more compute complex devices. Referring now to FIG. 6, shown is a block diagram of an example system with which embodiments may be used. In the illustration of FIG. 6, system 600 may be a mobile system such as a smartphone, tablet computer, 2:1 tablet, phablet, invehicle system, or other system. As illustrated, a SoC 610 is present and may be configured to operate as an application processor for the device.

A variety of devices may couple to SoC 610. In the illustration shown, a memory subsystem includes a flash memory 640 and a DRAM 645 coupled to SoC 610. In addition, a touch panel 620 is coupled to the SoC 610 to provide display capability and user input via touch, including provision of a virtual keyboard on a display of touch panel 820. To provide wired network connectivity, SoC 610 couples to an Ethernet interface 630. A peripheral hub 625 is coupled to SoC 610 to enable interfacing with various peripheral devices, such as may be coupled to system 600 by any of various ports or other connectors.

In addition to internal power management circuitry and functionality within SoC 610, a PMIC 680 is coupled to SoC 610 to provide platform-based power management, e.g., based on whether the system is powered by a battery 690 or AC power via an AC adapter 695. In addition to this power source-based power management, PMIC 680 may further perform platform power management activities based on environmental and usage conditions. Still further, PMIC 680 may communicate control and status information to SoC 610 to cause various power management actions within SoC 610.

Still referring to FIG. 6, to provide for wireless communication capabilities, a modem 650 is coupled to SoC 610 and in turn to an antenna 655. In various implementations, modem 650 may include circuitry for performing data traffic shaping as described herein. In some cases, modem 650 may include or couple to a DDR memory buffer (either present within modem 650 or possibly within DRAM 645). Modem 650 may perform traffic shaping to reduce data rates for, e.g., uplink data so as to reduce pressure on the buffer. Although shown as a separate unit in the embodiment of FIG. 6 in different implementations modem 650 (and its buffer memory) may be included within SoC 610 (with buffering within DRAM 645). As further illustrated, a plurality of sensors 660 may couple to SoC 610. These sensors may include various accelerometer, environmental and other sensors, including user gesture sensors. Finally, an audio codec 665 is coupled to SoC 610 to provide an interface to an audio output device 670. Of course understand that while shown with this particular implementation in FIG. 6, many variations and alternatives are possible.

Figure 7:
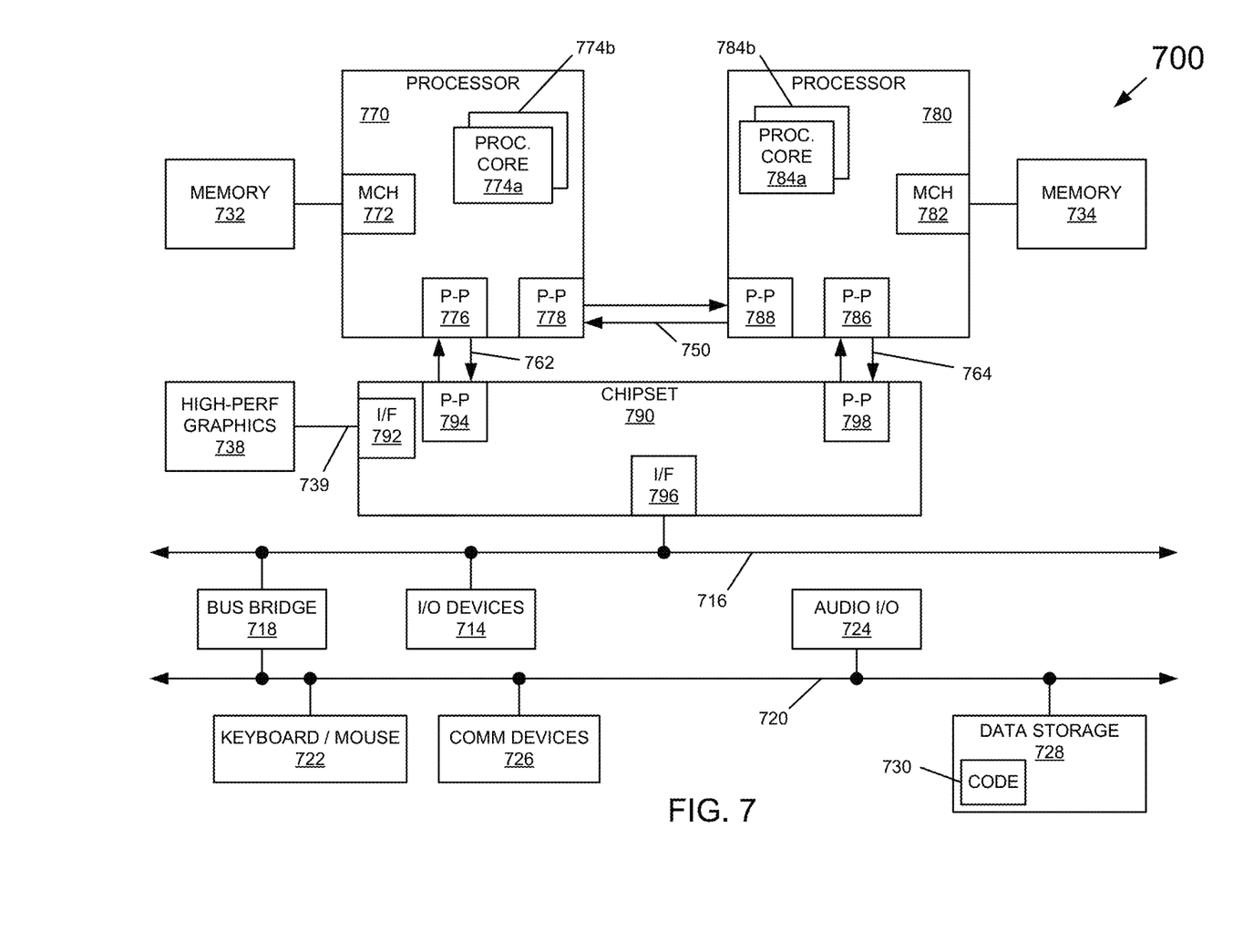
FIG. 7 is a block diagram of a system in accordance with an embodiment of the present invention.

Referring now to FIG. 7, shown is a block diagram of a system in accordance with an embodiment of the present invention. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774a and 774b and processor cores 784a and 784b), although potentially many more cores may be present in the processors.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 762 and 764, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. In embodiments, communication devices 726 may include modem circuitry as described herein to perform traffic shaping to reduce pressure on buffer memory. In other cases, such modem circuitry to perform traffic shaping may be present within processors 770 and 780. Further, an audio I/O 724 may be coupled to second bus 720. Embodiments can be incorporated into other types of systems including mobile devices such as a smart cellular telephone, tablet computer, netbook, Ultrabook™, or so forth.

Figure 8:
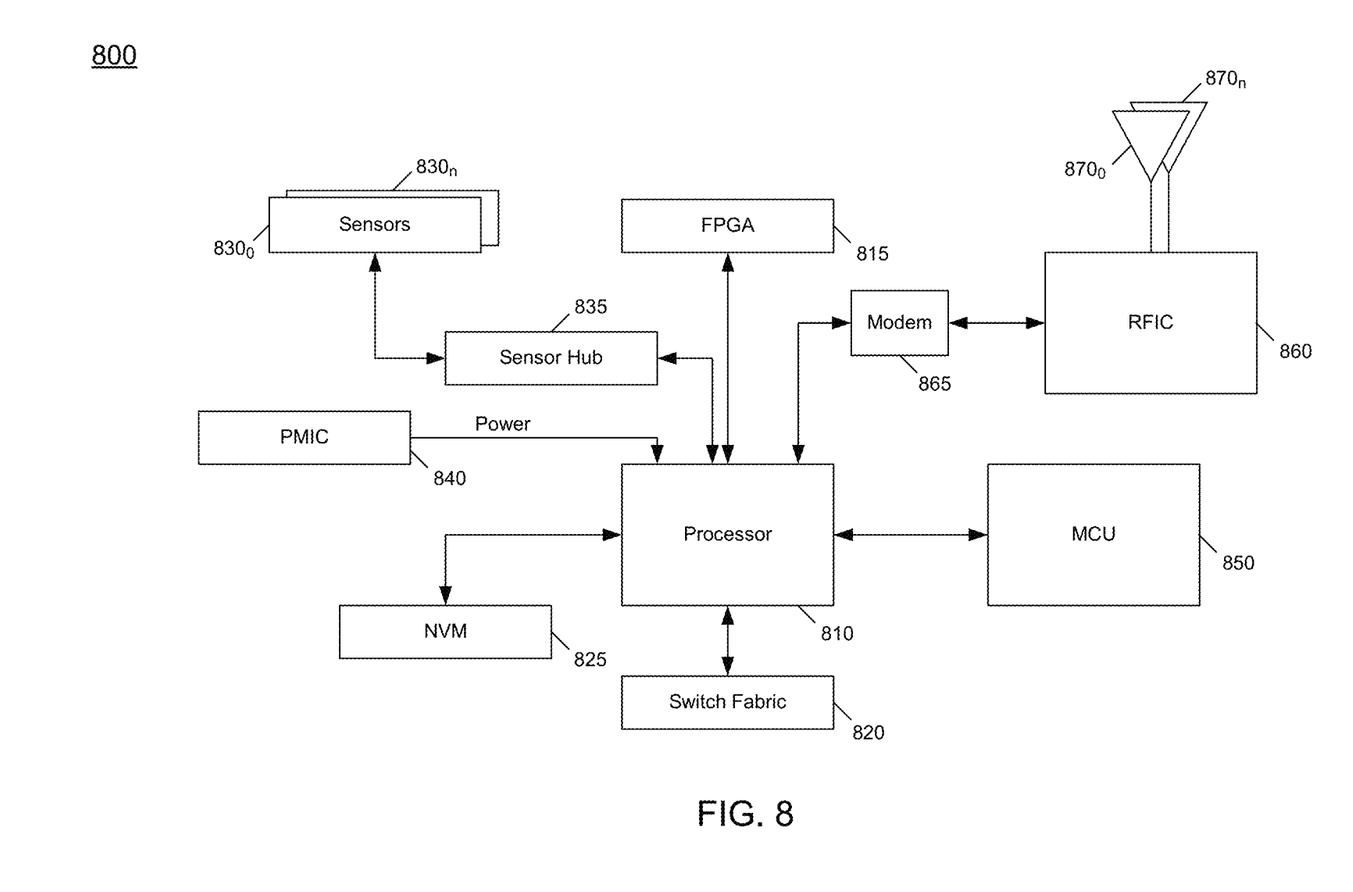
FIG. 8 is a block diagram of a system in accordance with another embodiment of the present invention.

Referring now to FIG. 8, shown is a block diagram of a system in accordance with another embodiment of the present invention. In the embodiment of FIG. 8, system 800 is an autonomous driving computing system. As such, system 800 may be implemented within a vehicle that provides for some level of autonomous driving. Understand that with different levels of autonomous driving control, different levels of workloads may be executed within system 800 to autonomously perform some or all driving tasks autonomously. As illustrated, system 800 includes a processor 810, which may be a general-purpose multicore processor or other SoC.

System 800 may further include one or more field programmable gate arrays (FPGAs) 815 or other programmable accelerators to which certain autonomous driving workloads may be offloaded. Processor 810 further couples to a non-volatile memory 825, which in an embodiment may be implemented as a flash memory. To provide communication with other components within a vehicle, processor 810 further couples to a switch fabric 820 which in an embodiment may be implemented as an Ethernet switch fabric that in turn may couple to other components within a vehicle, including display components, vehicle infotainment systems, and so forth. Still further, processor 810 (and switch fabric 820) also couples to a microcontroller 850.

Furthermore, to enable interaction with other systems, including other vehicles, roadway systems, over-the-air update sources, infotainment content sources, sensor data communication and so forth, processor 810 and MCU 850 may couple to one or more radio frequency integrated circuits (RFICs) 860. In embodiments, RFIC 860 may be configured to support 5G-based specifications for communication of automotive and other data via a variety of wireless networks. To this end, RFIC 860 may couple to one or more antennas $870_0$-$870_n$ of a vehicle. As further shown, RFIC 860 interfaces with processor 810 via a modem 865. In embodiments herein, modem 865 may be configured to perform traffic shaping of data, e.g., in uplink direction to reduce memory pressure, e.g., for a buffer memory included within or coupled to modem 865.

As further illustrated in FIG. 8, system 800 may include a plurality of sensors $830_0$-$830_n$ that provide sensor information, via a sensor hub 835 to processor 810. Although the scope of the present invention is not limited in this regard in embodiments, such sensors may include lidar, ultrasound, radar and optical sensors, among other sensor types. Such sensors may obtain large amounts of sensor data while the vehicle is in operation. Sensor hub 835 may be configured to fuse at least some of this data to provide information regarding the vehicle's surroundings, for provision to processor 810. In turn, processor 810 and/or FPGA 815 may use this fused sensor information in connection with performing autonomous driving workloads. Understand while shown at this high level in the embodiment of FIG. 8, many variations and alternatives are possible.

Figure 9:
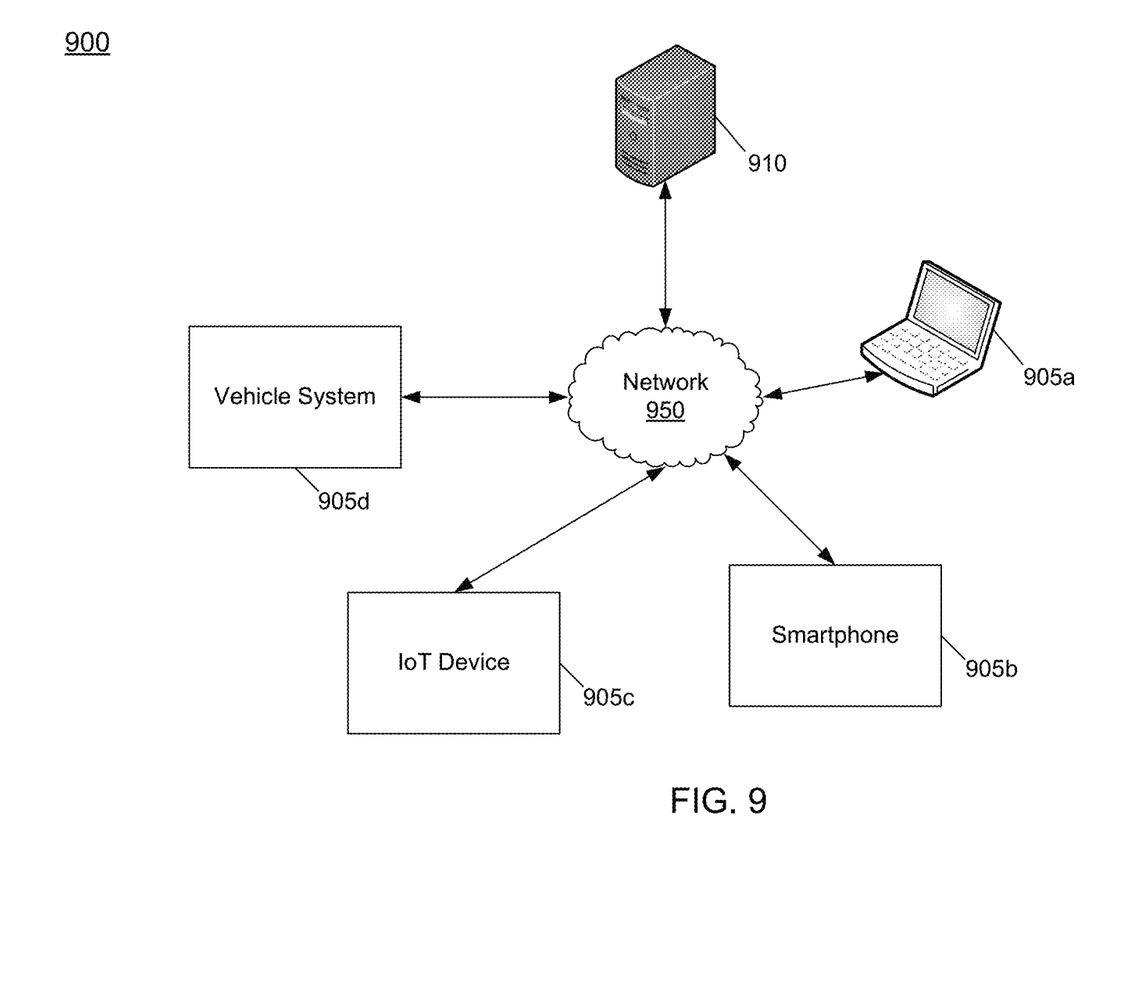
FIG. 9 is a block diagram of an environment in which traffic shaping can be performed in accordance with an embodiment of the present invention.

Referring now to FIG. 9, shown is a block diagram of an environment in which traffic shaping can be performed. As illustrated in FIG. 9, environment 900 provides for networked interaction between a variety of different types of computing devices that may couple via a network 950. In the embodiment illustrated, a variety of computing devices may be present, including relatively small devices including a laptop computer 905a, a smartphone 905b, an IoT device 905c, a vehicle system 905d, and a desktop computing device 910. Such computing devices may often operate in instances in which larger amounts of data are received in the downlink direction (i.e., from network 950 to the given device 905) than in the opposite direction. As such, modem or other circuitry within devices 905 may perform traffic shaping to communicate data asymmetrically, such that a combined bandwidth on a memory device for uplink and downlink data communication can be reduced. In this way embodiments can realize systems having memories with lower supported requirements and power consumption, reducing costs and power consumption. Understand while shown at this high level in the embodiment of FIG. 9, many variations and alternatives are possible.

The following examples pertain to further embodiments.

In one example, an apparatus comprises: a transmitter to send first data to a device coupled to the apparatus via a physical link; a receiver to receive second data from the device via the physical link, the physical link to operate in a dual simplex mode; and a control circuit coupled to the transmitter and the receiver, the control circuit to control the transmitter to send the first effective data at a first effective rate during a link activation interval of a data transfer interval and to control the receiver to receive the second data at a second effective rate during the link activation interval, the second effective rate different than the first effective rate, to reduce a duration of the link activation interval.

In an example, the control circuit is to determine the duration of the link activation interval based at least in part on an amount of the second data.

In an example, the control circuit is to determine the duration of the link activation interval further based on a bandwidth capability of the device.

In an example, the control circuit is to determine the first effective rate based on the duration of the link activation interval and the amount of the first data.

In an example, the amount of the second data exceeds the amount of the first data.

In an example, the control circuit is to cause the physical link to be in an idle state following the link activation interval.

In an example, the control circuit comprises a regulator to shape traffic of the first data so that the first data is sent substantially co-incidentally with the receipt of the second data during the link activation interval.

In an example, the second effective rate is greater than the first effective rate.

In an example, the control circuit is to control the transmitter and the receiver to operate at a common rate when an amount of the first data and the second data is less than a threshold amount.

In another example, a method comprises: determining, in a control circuit, a link activation duration for a link that couples a memory device and a first device based at least in part on a first data transport load to be communicated between the memory device and the first device in a first direction; determining, in the control circuit, a second data rate for communication of a second data transport load to be communicated between the memory device and the first device in a second direction, based on the link activation duration and the second data transport load; and sending the first data transport load in the first direction at a first data rate and sending the second data transport load in the second direction at the second data rate.

In an example, the method further comprises accumulating the first data transport load and the second data transport load during a first period.

In an example, the method further comprises sending the first data transport load and the second data transport load during the link activation duration, the link activation duration comprising a portion of a second period following the first period.

In an example, the method further comprises after sending the first data transport load and the second data transport load during the link activation duration, idling the link for a remainder of the second period.

In an example, the method further comprises determining that an amount of the first data transport load and the second data transport load exceeds a threshold amount, and responsive thereto determining the link activation duration based at least in part on the first data transport load.

In an example, the method further comprises: sending the first data transport load in the first direction at the first data rate, the first data rate comprising a maximum data rate for the link; and sending the second data transport load in the second direction at the second data rate, the second data rate less than the maximum data rate.

In an example, the method further comprises determining that an amount of the first data transport load and the second data transport load is less than a threshold amount, and responsive thereto, sending the first data transport load and the second data transport load at a symmetric data rate.

In an example, the method further comprises sending the first data transport load and the second data transport load at the symmetric data rate comprising a maximum data rate for the link.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a modem circuit to send first data to a network component in an uplink direction and to receive second data from the network component in a downlink direction; a memory coupled to the modem circuit to buffer at least some of the first data and the second data; and an application processor coupled to the modem circuit via a physical link. The modem circuit may include a control circuit to control transmission of the first data via the physical link at a first rate during a link activation interval of a data transfer interval and to control transmission of the second data via the physical link at a second rate during the link activation interval, the second rate different than the first rate, to reduce a duration of the link activation interval.

In an example, the control circuit is to determine the duration of the link activation interval based at least in part on an amount of the second data.

In an example, the control circuit is to determine the duration of the link activation interval further based on a bandwidth capability of the memory, and determine the first rate based on the duration of the link activation interval and the amount of the first data.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a transmitter to send first data to a device coupled to the apparatus via a physical link;
   a receiver to receive second data from the device via the physical link, the physical link to operate in a dual simplex mode; and
   a control circuit coupled to the transmitter and the receiver, the control circuit to control the transmitter to send the first data at a first effective rate during a link activation interval of a data transfer interval and to control the receiver to receive the second data at a second effective rate during the link activation interval, the second effective rate different than the first effective rate, to reduce a duration of the link activation interval, wherein the control circuit is to determine the duration of the link activation interval based at least in part on an amount of the second data.

2. The apparatus of claim 1, wherein the control circuit is to determine the duration of the link activation interval further based on a bandwidth capability of the device.

3. The apparatus of claim 1, wherein the control circuit is to determine the first effective rate based on the duration of the link activation interval and the amount of the first data.

4. The apparatus of claim 3, wherein the amount of the second data exceeds the amount of the first data.

5. The apparatus of claim 1, wherein the control circuit is to cause the physical link to be in an idle state following the link activation interval.

6. The apparatus of claim 1, wherein the control circuit comprises a regulator to shape traffic of the first data so that the first data is sent substantially co-incidentally with the receipt of the second data during the link activation interval.

7. The apparatus of claim 1, wherein the second effective rate is greater than the first effective rate.

8. The apparatus of claim 1, wherein the control circuit is to control the transmitter and the receiver to operate at a common rate when an amount of the first data and the second data is less than a threshold amount.

9. A non-transitory machine-readable medium having stored thereon instructions, which if performed by a machine cause the machine to perform a method comprising:
   determining, in a control circuit, a link activation duration for a link that couples a memory device and a first device based at least in part on a first data transport load to be communicated between the memory device and the first device in a first direction;
   determining, in the control circuit, a second data rate for communication of a second data transport load to be communicated between the memory device and the first device in a second direction, based on the link activation duration and the second data transport load; and
   sending the first data transport load in the first direction at a first data rate and sending the second data transport load in the second direction at the second data rate.

10. The non-transitory machine-readable medium of claim 9, wherein the method further comprises accumulating the first data transport load and the second data transport load during a first period.

11. The non-transitory machine-readable medium of claim 10, wherein the method further comprises sending the first data transport load and the second data transport load during the link activation duration, the link activation duration comprising a portion of a second period following the first period.

12. The non-transitory machine-readable medium of claim 11, wherein the method further comprises after sending the first data transport load and the second data transport load during the link activation duration, idling the link for a remainder of the second period.

13. The non-transitory machine-readable medium of claim 9, wherein the method further comprises determining that an amount of the first data transport load and the second data transport load exceeds a threshold amount, and responsive thereto determining the link activation duration based at least in part on the first data transport load.

14. The non-transitory machine-readable medium of claim 9, wherein the method further comprises:
   sending the first data transport load in the first direction at the first data rate, the first data rate comprising a maximum data rate for the link; and
   sending the second data transport load in the second direction at the second data rate, the second data rate less than the maximum data rate.

15. The non-transitory machine-readable medium of claim 9, wherein the method further comprises determining that an amount of the first data transport load and the second data transport load is less than a threshold amount, and responsive thereto, sending the first data transport load and the second data transport load at a symmetric data rate.

16. The non-transitory machine-readable medium of claim 15, wherein the method further comprises sending the first data transport load and the second data transport load at the symmetric data rate comprising a maximum data rate for the link.

17. A system comprising:
   a modem circuit to send first data to a network component in an uplink direction and to receive second data from the network component in a downlink direction;
   a memory coupled to the modem circuit to buffer at least some of the first data and the second data; and
   an application processor coupled to the modem circuit via a physical link, wherein the modem circuit includes a control circuit to control transmission of the first data via the physical link at a first rate during a link activation interval of a data transfer interval and to control transmission of the second data via the physical link at a second rate during the link activation interval, the second rate different than the first rate, to reduce a duration of the link activation interval, wherein the control circuit is to determine the duration of the link activation interval based at least in part on an amount of the second data.

18. The system of claim 17, wherein the control circuit is to determine the duration of the link activation interval further based on a bandwidth capability of the memory, and determine the first rate based on the duration of the link activation interval and the amount of the first data.

* * * * *